June 7, 1966 J. A. GHORMLEY 3,255,046
MEANS FOR CONVERTING HIGH ENERGY RADIATION TO ELECTRICAL ENERGY
Filed Feb. 16, 1961
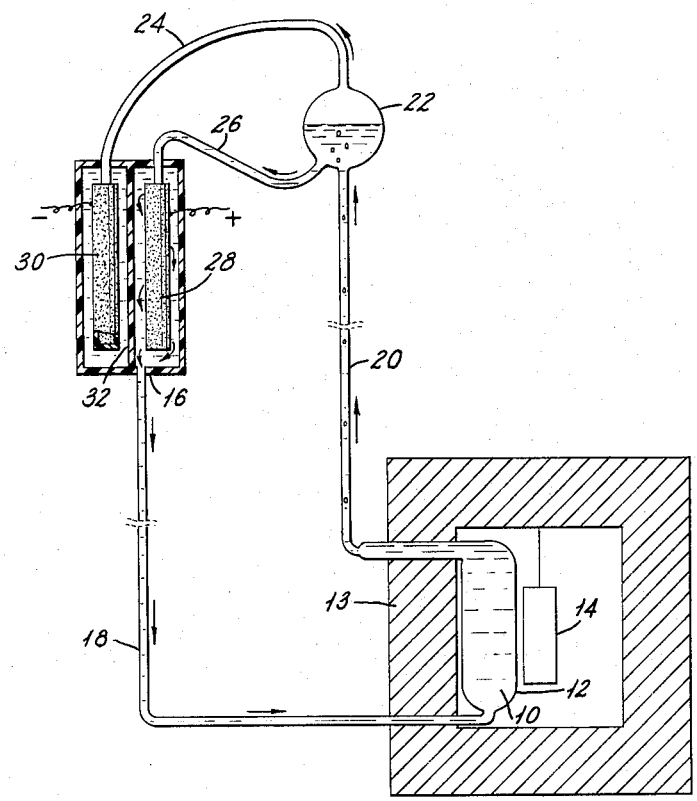
INVENTOR.
JOHN A. GHORMLEY
BY *Harrie M Humphreys*
ATTORNEY United States Patent Office 3,255,046
Patented June 7, 1966

3,255,046
MEANS FOR CONVERTING HIGH ENERGY RADIATION TO ELECTRICAL ENERGY
John A. Ghormley, Bay Village, Ohio, assignor to Union Carbide Corporation, a corporation of New York
Filed Feb. 16, 1961, Ser. No. 90,162
8 Claims. (Cl. 136—86)

This application is a continuation-in-part of application Serial Number 773,348 filed November 12, 1958 and now abandoned.

This invention relates to novel means, methods and apparatus for converting high energy radiation to electrical energy. The invention is also concerned with converting nuclear waste products into electrical power in a practical range of voltage.

The term "high energy radiation" as used hereinabove and hereinafter is meant to include electromagnetic radiation having a wavelength shorter than the visible spectrum, such as ultraviolet rays, X-rays and gamma rays for example, as well as neutral or charged particulate radiation such as beta rays, positrons, fission recoils, and alpha particles for example. For the purposes of simplicity and clarity, the generic term defined above will be used throughout.

Various means have already been proposed for converting high energy radiation into electrical energy. Among these, radiation batteries that convert nuclear energy or radiation into electrical energy suffer from very low efficiency or other difficulties. Direct converters, such as the strontium-90 high voltage battery in which direct collection of the beta particles is employed, usually operate with efficiencies of 0.1 to 0.01 percent, although theoretically high efficiency can be obtained in impractical units and special purpose devices. In the most efficient practical nuclear batteries presently known, namely, the Polonium-210 alpha heated thermopile battery, the efficiency has recently been raised to 5 percent, but the battery requires very high specific activity of expensive radioactive material to achieve this efficiency.

It has now been found in accord with the present invention that a novel combination of three elements in a particular apparatus permits the practical withdrawal of a fairly large fraction of power from high energy radiation sources. These elements are (1) the high energy radiation source (e.g., reactor, gamma source, ultra violet light, etc.) (2) a working solution (e.g., aqueous salt solution) and (3) an electrochemical recombination cell. In this system, a high energy radiation source is employed to alter the working fluid in such manner as to provide species capable of being discharged by the recombination cell thereby releasing electrochemical energy directly as electricity. The process is cyclic, and can be run continuously simply by reirradiating the working fluid after discharging it through the electrochemical combination cell.

It is, therefore, the main object of this invention to realize the highly efficient conversion of high energy radiation to electrical energy.

It is an equally important object of this invention to provide novel apparatus for effecting such a conversion.

Other objects and advantages of the invention will appear in the course of its description.

In the drawings:
The single figure is a schematic representation of an apparatus for carrying out the present invention.

Nuclear energy suitable for use in the present invention can be derived from several sources. One such source is a nuclear reactor which has an aqueous shield. As stated in the Fermi patent, U.S. 2,837,477, the energy absorbed in the water shield of certain nuclear reactors can result in the liberation of 2200 cubic feet per day of an explosive mixture of hydrogen and oxygen. Another nuclear energy source is the homogeneous reactor. Still another suitable source consists of a radionuclide dissolved in a solution. Sources of non-nuclear high energy radiation include invisible ultraviolet light rays from the sun, special lamps and filaments which radiate in the appropriate range.

Suitable radiation-sensitive fluids include aqueous solutions such as 0.1 Molar ferrous sulfate, for example with a solvent of normal or heavy water. This water may be the reactor shield, the coolant in heterogeneous reactors, the canal water in cooling caves or the core of a homoeneous reactor. The fluid may consist of de-aerated aqueous solutions of ferrous sulfate acidified with sulfuric acid (suitably to approximately 0.4 Molar). These, when irradiated with high energy radiation, yield ferric ions and hydrogen gas, which may be recombined in an electrochemical recombination cell wherein hydrogen gas is oxidized while the ferric ion is reduced to ferrous ion. The net overall reaction involved in the production of ferric ions and hydrogen gas is as follows:

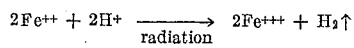

$$2Fe^{++} + 2H^+ \xrightarrow{radiation} 2Fe^{+++} + H_2\uparrow$$

The electrode reactions in the electrochemical recombination portion of the device may be described by the equations:

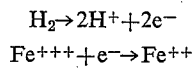

$$H_2 \rightarrow 2H^+ + 2e^-$$
$$Fe^{+++} + e^- \rightarrow Fe^{++}$$

Deuterium or (tritum) may be substituted for hydrogen in the above reactions, for example, when heavy water is used. (Competing side reactions, such as from undesirable contaminants, are explicitly omitted for clarity at this point.) The conversion is continuously accomplished by irradiating a container of acidified, de-aerated ferrous sulfate with nuclear radiations, such as gamma rays, alpha particles, fission recoils, beta particles, or combinations thereof, or ultra violet radiation; and separating the principal reaction products, namely gaseous hydrogen and ferric ions in solution. The hydrogen gas and ferric ions are then reconverted into hydrogen ions and ferrous ions in the recombination cell portion of this device and the products, therefore, then are reirradiated resulting in continuous operation of the system. Theoretical maximum efficiency of the conversion process is 6 percent for gamma radiation and, 2 percent for fission recoils. Indications from experimental demonstrations of the process with gamma radiation show that at least several percent is actually practical.

The following detailed discussion of the mechanism of the operation of the radiation-induced reactions will serve to clarify the operating principles of the instant invention, but the same should not be construed as limited thereby.

The measured yield for oxidation of ferrous ion and simultaneous production of an equivalent amount of hydrogen by gamma radiation is 8.2 ferric ions or 4.1 hydrogen molecules per 100 ev. of absorbed gamma energy. This yield is explained on the basis of decomposition of water containing 0.4 molar sulfuric acid (Hochanadel & Lind, Annual Review of Physical Chemistry, 1956, vol. 7, pp. 83ff) as follows:

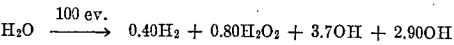

$$4.50H_2O \xrightarrow{100\ ev.} 0.40H_2 + 0.80H_2O_2 + 3.70H + 2.90OH$$

These numbers represent 100 ev. yields, or molecules formed per 100 ev. gamma energy absorbed by water. The oxidation of ferrous ions is thought to occur through the following reactions:

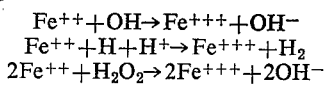

$$Fe^{++} + OH \rightarrow Fe^{+++} + OH^-$$
$$Fe^{++} + H + H^+ \rightarrow Fe^{+++} + H_2$$
$$2Fe^{++} + H_2O_2 \rightarrow 2Fe^{+++} + 2OH^-$$

The observed yield in the case of the above reactions is slightly lower than would be predicted from the above reactions and drops with increasing ferric/ferrous ratio due to the reaction:

$$Fe^{+++} + H \rightarrow Fe^{++} + H^+$$

The presence of molecular hydrogen also lowers the yield, presumably by its contribution to ferric ion reduction in the previous equation through the reactions:

$$H_2 + OH \rightarrow H_2O + H$$

In order to attain a high yield for hydrogen production by high energy irradiation of an aqueous system containing oxidizable ions, the following conditions must be met:

(a) Hydrogen peroxide must oxidize the reduced form of the ion.
(b) Hydrogen peroxide must not reduce the oxidized form of the ion or decompose to yield oxygen.
(c) Hydrogen atoms (with the help of hydrogen ions) must oxidize the reduced ion.
(d) Hydrogen atoms must not reduce the oxidized ion.

An example of a radiation-induced oxidation which does not give a high yield is:

$$Fe(CN)_6^{-4} + H_2O \xrightarrow{\text{radiation}} Fe(CN)_6^{-3} + \tfrac{1}{2}H_2 + OH^-$$

The hydrogen yield is 0.55 molecule per 100 ev. (H. Fricke and E. Hart, J. Chem. Phys. 3,596 (1935). Since hydrogen peroxide is known to oxidize the reduced form, it may be assumed that hydrogen atoms reduce the oxidized form. For the reaction $$Fe(CN)_6^{4-} \rightarrow Fe(CN)_6^{3-} + e(E° = -0.36 \text{ v.})$$

the maximum efficiency obtainable from the ferrocyanide system in a nuclear energy converter would be $$\frac{(2)(0.55)(0.36)(100)}{(100)} = 0.4 \text{ percent}$$

Some other redox systems which also give approximately the same hydrogen yield are:

$$H_2SeO_3 + H_2O \rightarrow SeO_4^{=} + 4H^+ + 2e$$
Max. Effic. = 1.3%
$$HAsO_2 + 2H_2O \rightarrow H_3AsO_4 + 2H^+ + 2e$$
Max. Effic. = 0.6%

If the same yield is assumed for the oxidation of uranous to uranyl, since $E° = 0.62$ v., the maximum efficiency for conversion of gamma radiation energy would be 0.7 percent.

For the conversion of fission recoil energy (in a homogeneous reactor) the requirements are somewhat different. The reactions of hydrogen atoms and hydroxyl radicals contribute little to the observed yields, and only the reactions of molecular hydrogen and hydrogen peroxide need be considered. The molecular hydrogen yield in uranyl sulfate solutions increases with decreasing uranyl ion concentration to an extrapolated value of 1.8 at zero uranyl ion concentration. The production of some oxygen lowers the efficiency. Thus, the maximum efficiency for conversion of energy from a homogeneous reactor would be less than 2.2 percent.

Although the above discussion has been confined for clarity generally to acid redox systems, basic or neutral systems behave similarly, and may advantageously be used as the working solutions for practical high energy radiation to electrical energy converters.

One type of apparatus used in the present invention appears in the drawing. The apparatus comprises an irradiation cell 10 having a casing 12 of a material little affected by high energy radiations such as glass, graphite, or metal adjacent to a radiation source 14 such as cobalt 60 or a mercury resonance lamp, for example. For safety, a radiation shield 13, suitably of lead or concrete, surrounds the radiation source and irradiation cell. The irradiation cell may suitably contain 0.1 molar ferrous sulfate acidified to 0.4 molarity with sulfuric acid. The irradiation cell communicates with an electrochemical recombination cell 16 through suitable conduits 18, 20, the last numbered conduit being in connection with liquid-gas separator 22, communicating through conduits 24 and 26 with the anode 28 and cathode 30 of recombination cell 16. Separating the anode from the cathode, there may be a separator membrane 32, suitably a sheet of regenerated cellulose about 0.01 to 0.015 inch thick or a mat of glass fibers. The purpose of the separator is to prevent ferric ions which are in contact with the positive electrode from contacting the hydrogen electrode since a subsequent reaction would cause a short circuit in the cell. At this point it should be noted that such a separator is not absolutely necessary. In fact, a system of the type just described which did not have a separator in its recombination cell was found to have an efficiency of 3.1 percent.

The positive or ferric-ferrous electrode consists of a hollow porous graphite tube open at the top, but closed at the bottom. Catalysts may be provided in the electrode to activate the surface thereof, but this measure is not absolutely necessary.

The negative or hydrogen electrode is familiar to those skilled in the hydrogen-oxygen fuel cell technology, and is also a hollow tube of porous carbon or graphite having the same dimensions as the positive electrode. The electrode is specially treated prior to incorporation in the cell by applying to the surface thereof a hydrogen decomposition catalyst. Such catalysts can be any transition metal from Group VIII of the Periodic Classification of elements including palladium, ruthenium, iridium, rhodium, osmium, platinum as well as iron, and nickel as long as the metal does not dissolve in the working solution. The application of the metal catalyst to the electrode surface is a simple operation. A solution of the chloride of the selected metal is painted on the electrode surface, and decomposed by heating the painted electrode to a temperature below 400° C. while the same is in a hydrogen atmosphere. If platinum is selected, a 10 percent aqueous solution of chloroplatinic acid is used. Ten milliliters of such a solution is required in order to provide a calculated surface coverage of two milligrams of the metal per square centimeter on a 12 inch electrode. Where rhodium is selected, 10 milliliters of a 10 percent aqueous solution of rhodium chloride will produce the same results. Generally, the amount of metal catalyst present on the electrode surface should be from 1 to 8 mg./cm.² of electrode surface with the preferred amount being about 2 mg./cm.².

In a working embodiment of the invention which used electrodes having a ¾ inch outside diameter, a ½ inch inside diameter with a wall thickness of ⅛ inch, in conjunction with a 3500 Curie cobalt 60 gamma source adjacent to a 3 gallon container of acidified solution of 0.1 M ferrous sulfate (rate of absorption 4.05 watts), continuous operation for over two months at 0.5 volt and 150 milliamperes has been obtained.

One of the advantages of this invention with respect to the use of nuclear energy in the disclosed converter is that the working solution does not become radioactive if a gamma ray source is used for the primary power input.

Another working embodiment of this invention utilized identical apparatus as described above changing only to a fused quartz vessel with a volume of 265 milliliters of solution therein. A Hanovia SC 2537 mercury resonance lamp operating in a water bath at 25° C. supplied ultraviolet radiation of a wavelength of 2536 Angstroms. A continuous current of 4 milliamperes at 0.6 volt was drawn from the apparatus for a period of 48 hours. The conversion efficiency for this cell was 0.23 percent. It should be understood that a commercial battery of this type would probably use an ultra violet radiation source other than a lamp since it takes more electric power to operate the lamp than the cell produces. The source of radiation should be one which is substantially free, such as sunlight.

An especially desirable feature of the instant converter is that waste fission products, which have been considered an undesirable radiation by-product that must be disposed of by burial or isolation, are made useful in a relatively efficient manner by the present invention. Similarly, use of fuel element "cooling caves" can produce valuable power which is presently wasted.

Many variations are possible in the number, size and arrangement of the electrode used in the electrochemical recombination cell or in the geometry of the irradiation unit. For example, the electrode arrangement can be concentric or the electrodes can be in the form of plates, which plates are themselves stacked to form the cell. Cell voltages and current densities obtainable with these constructions are greater than those obtainable with a cell composed of two tubular electrodes.

Other reduction-oxidation couples which are operative in this invention are arsenic/arsenous and selenic/selenous.

What is claimed is:
1. A device for converting high energy radiation to electrical energy which comprises: a closed system containing a deaerated aqueous solution of ions, said ions forming an oxidation-reduction couple capable of being irradiated into a higher free energy state than the state existing prior to irradiation with the production of hydrogen gas; radiation cell means for subjecting said solution to high energy radiation from a radiation source external to said radiation cell means to cause said radiation to interact with said solution and to raise said oxidation-reduction couple to a higher free energy state and produce hydrogen gas; a liquid-gas separator having an inlet for said irradiated solution and two outlets, a liquid outlet communicating with the reducing electrode of an electrochemical recombination cell and a gas outlet communicating with the oxidizing electrode of said recombination cell, said hydrogen gas being consumed at said oxidizing electrode and the oxidation-reduction couple being returned to its lower free energy state at said reducing electrode, electricity being produced by said electrode reactions; and means communicating between said recombination cell and said radiation cell means to complete said closed system.

2. A device as described in claim 1 wherein said electrochemical recombination cell has a regenerated cellulose membrane separating said oxidizing electrode from said reducing electrode.

3. A device as described in claim 1 wherein said reduction-oxidation couple is selected from the group consisting of ferric/ferrous, arsenic/arsenous, selenic/selenous, and uranyl/uranous.

4. A device as described in claim 1 wherein said radiation is selected from the group consisting of ultraviolet light, X-rays, gamma rays, alpha particles, beta particles, neutrons and fission recoils.

5. A device as described in claim 1 wherein said aqueous solution is a heavy water solution.

6. A device as described in claim 1 wherein said reducing electrode is a hollow porous graphite tube and said oxidizing electrode is a hollow porous carbon tube having a hydrogen decomposition catalyst on the surface thereof.

7. A device for converting high energy radiation to electrical energy which comprises: a closed system containing a deaerated aqueous solution of ferrous and ferric ions, said ions forming an oxidation-reduction couple capable of being irradiated into a higher free energy state than the state existing prior to irradiation by the oxidation of ferrous ions to ferric ions and the production of hydrogen gas; a radiation cell for subjecting said solution to high energy radiation from a radiation source external to said radiation cell to cause said radiation to interact with said solution to oxidize ferrous ions to ferric ions and produce hydrogen gas; a liquid-gas separator having an inlet for said irradiated solution and two outlets, a liquid outlet communicating with the reducing electrode of an electrochemical recombination cell and a gas outlet communicating with the oxidizing electrode of said recombination cell, said hydrogen gas being consumed at said oxidizing electrode and the oxidation-reduction couple being returned to its lower free energy state at said reducing electrode by the reduction of ferric ions to ferrous ions, electricity being produced by said electrode reactions; and means communication between said recombination cell and said radiation cell to complete said closed system.

8. The method for converting high energy radiation into electrical energy which comprises the steps of: irradiating with high energy radiation a deaerated aqueous solution of ions, the source of said radiation being external to said solution, and said ions forming an oxidation-reduction couple capable of being irradiated into a higher free energy state than the state existing prior to irradiation with the production of oxidized ion species and hydrogen gas; passing said oxidized ion species to the reducing electrode of an electrochemical recombination cell and said hydrogen gas to the oxidizing electrode of said electrochemical recombination cell; and reirradiating the reduced ion species resulting from said recombination cell thereby forming a continuous system.

References Cited by the Examiner

Jour. of Amer. Chem. Soc., vol. 52, February 1930, page 465.

Nature, June 17, 1944, vol. 153, pages 748–750.

Second United Nations International Conference on the Peaceful Uses of Atomic Energy, vol. 29, pages 5–11.

Status Report on Fuel Cells, by B. R. Stein, June 1959, U.S. Dept. of Comm., Office of Technical Service, pages 20–22 and 60–61.

Status Report of Record, page 23.

WINSTON A. DOUGLAS, *Primary Examiner.*

JOHN R. SPECK, JOHN H. MACK, *Examiners.*